(12) United States Patent
Wang et al.

(10) Patent No.: US 12,490,150 B2
(45) Date of Patent: Dec. 2, 2025

(54) APPARATUSES, METHODS, AND COMPUTER READABLE MEDIA FOR TERAHERTZ CHANNEL COMMUNICATION

(71) Applicant: NOKIA SOLUTIONS AND NETWORKS OY, Espoo (FI)

(72) Inventors: Wenjian Wang, Shanghai (CN); Pingping Wen, Shanghai (CN); Tao Yang, Shanghai (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 16 days.

(21) Appl. No.: 18/682,679

(22) PCT Filed: Mar. 10, 2022

(86) PCT No.: PCT/CN2022/080119
§ 371 (c)(1),
(2) Date: Feb. 9, 2024

(87) PCT Pub. No.: WO2023/040215
PCT Pub. Date: Mar. 23, 2023

(65) Prior Publication Data
US 2024/0356778 A1 Oct. 24, 2024

(30) Foreign Application Priority Data
Sep. 16, 2021 (WO) ................ PCT/CN2021/118706

(51) Int. Cl.
*H04L 1/00* (2006.01)
*H04B 7/0452* (2017.01)
(Continued)

(52) U.S. Cl.
CPC .......... *H04W 28/20* (2013.01); *H04B 7/0452* (2013.01); *H04B 7/0456* (2013.01);
(Continued)

(58) Field of Classification Search
CPC . H04W 28/20; H04W 28/0226; H04W 64/00; H04W 64/003; H04B 7/0452;
(Continued)

(56) References Cited

U.S. PATENT DOCUMENTS

2005/0201474 A1 9/2005 Cho et al.
2018/0343044 A1 11/2018 Athley et al.

FOREIGN PATENT DOCUMENTS

CN 107248961 A 10/2017
CN 107277829 A 10/2017
(Continued)

OTHER PUBLICATIONS

International Search Report and Written Opinion dated May 25, 2022 corresponding to International Patent Application No. PCT/CN2021/118706.

(Continued)

*Primary Examiner* — Vineeta S Panwalkar
(74) *Attorney, Agent, or Firm* — SQUIRE PATTON BOGGS (US) LLP

(57) ABSTRACT

Disclosed are devices, methods, apparatuses, and computer readable media for terahertz channel communication. An example communication apparatus for transmission property sensitive band group, characterized in employing aware information of a terminal device, which may comprise channel state information, information on available band and positioning information of the terminal device may include at least one processor and at least one memory. The at least one memory may include computer program code, and the at least one memory and the computer program code may be configured to, with the at least one processor, cause the communication apparatus as the terminal device to perform: determining the channel state information and the information on the available band and transmitting, to a (Continued)

network device, the channel state information and the information on the available band; and on request, determining the positioning information of the terminal device and transmitting, to the network device, the positioning information.

20 Claims, 7 Drawing Sheets

(51) Int. Cl.
    *H04B 7/0456*     (2017.01)
    *H04L 25/02*     (2006.01)
    *H04L 27/26*     (2006.01)
    *H04W 28/02*     (2009.01)
    *H04W 28/20*     (2009.01)
    *H04W 64/00*     (2009.01)

(52) U.S. Cl.
    CPC ........ *H04L 25/0204* (2013.01); *H04L 25/022* (2013.01); *H04L 25/0222* (2013.01); *H04L 27/2646* (2013.01); *H04W 28/0226* (2013.01); *H04W 64/00* (2013.01)

(58) Field of Classification Search
    CPC ... H04B 7/0456; H04B 10/90; H04L 25/0204; H04L 25/022; H04L 25/0222; H04L 27/2646; H04L 1/0003; H04L 1/0009; H04L 1/0023; H04L 1/0026; H04L 1/06; H04L 5/0069; H04L 5/0091; H04L 27/2666; H04L 5/0044; H04L 25/0202
    See application file for complete search history.

(56) References Cited

FOREIGN PATENT DOCUMENTS

CN      111213393 A     5/2020
CN      112751798 A     5/2021

OTHER PUBLICATIONS

International Search Report and Written Opinion dated Jun. 22, 2022 corresponding to International Patent Application No. PCT/CN2022/080119.

Chong Han et al., "Distance-Aware Multi-Carrier (DAMC) Modulation in Terahertz Band Communication," 2014 IEEE International Conference on Communications (ICC), Aug. 28, 2014.

The extended European Search Report dated Apr. 14, 2025, corresponding to European Patent Application No. 21957076.9.

Alexandros-Apostolos A. Boulogeorgos et al. ; "A distance and bandwidth dependent adaptive modulation scheme for THz comunications"; 2018 IEEE 19th International Workshop on Signal Processing Advances in Wireless Communications (SPAWC) ; Jun. 25, 2018 ; XP033393166.

Ian F. Akyildiz et al. ; "Combating the Distance Problem in the Millimeter Wave and Terahertz Frequency Bands"; IEEE Communications Magazine ; Feb. 13, 2019 ; XP081028466.

Sarieddeen Hadi et al. ; "Terahertz-Band Ultra-Massive Spatial Modulation MIMO"; IEEE Journal on Selected Areas in Communications, vol. 37, No. 9 ; Sep. 1, 2019 ; XP011740417.

ents relate to methods, apparatuses, and
APPARATUSES, METHODS, AND COMPUTER READABLE MEDIA FOR TERAHERTZ CHANNEL COMMUNICATION This Application claims from the benefit of PCT Application No. PCT/CN2021/118706, filed Sep. 16, 2021, titled "METHODS, APPARATUSES, AND COMPUTER READABLE MEDIA FOR TERAHERTZ CHANNEL COMMUNICATION," the entirety of which is incorporated herein by reference.

TECHNICAL FIELD

Various embodiments relate to methods, apparatuses, and computer readable media for terahertz channel communication.

BACKGROUND

Terahertz (THz) channel provides wireless communication devices with a band ranging from several tens of GHz up to a few THz. Some phenomenon may cause path loss of THz channel. For example, the absorption by water vapor molecules may affect the propagation of THz-band signals. The path loss may be different for different transmission distances. For communication distances below one meter, the THz band behaves as a single transmission window of several THz wide. As the transmission distance increases, the molecular absorption may cause multiple transmission sub-windows separated by absorption lines. Moreover, the absorption line peaks become both stronger and wider and the band of each individual transmission sub-window shrinks with the increasing of transmission distance.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, disclosed is a communication apparatus for transmission property sensitive band group, characterized in employing aware information of a terminal device, which may comprise channel state information, information on available band and positioning information of the terminal device. The communication apparatus may include at least one processor and at least one memory. The at least one memory may include computer program code, and the at least one memory and the computer program code may be configured to, with the at least one processor, cause the communication apparatus as the terminal device to perform: determining the channel state information and the information on the available band and transmitting, to a network device, the channel state information and the information on the available band; and on request, determining the positioning information of the terminal device and transmitting, to the network device, the positioning information.

In some example embodiments, the information on the available band may be determined by: receiving, from the network device, mapping information on property of distance and band; determining a band of a transmission window based on the mapping information and a distance to the network device; identifying whether at the band a subcarrier is an available subcarrier or a virtual subcarrier which fails to support reliable symbol transmission; and determining the available band by excluding one or more virtual subcarriers from the band.

In some example embodiments, the aware information may further comprise a signal-to-noise ratio.

In some example embodiments, the channel state information may be calculated based on path loss, beam unaligned fading and multipath fading.

In a second aspect, disclosed is a communication apparatus for transmission property sensitive band group, characterized in employing aware information of a terminal device, which may comprise channel state information, information on available band and positioning information of the terminal device. The communication apparatus may include at least one processor and at least one memory. The at least one memory may include computer program code, and the at least one memory and the computer program code may be configured to, with the at least one processor, cause the communication apparatus as a network device to perform: receiving, from the terminal device, the channel state information and the information on the available band; collecting the positioning information of the terminal device; and calculating parameters for an adaptive modulation based on the aware information.

In some example embodiments, the aware information may further comprise a signal-to-noise ratio, and the at least one memory and the computer program code may be further configured to, with the at least one processor, cause the communication apparatus to further perform: determining whether to adjust the parameters based on the aware information and a modulation granularity rule.

In some example embodiments, the modulation granularity rule may be associated with a distance to the terminal device, the signal-to-noise ratio and the available band.

In some example embodiments, the at least one memory and the computer program code may be further configured to, with the at least one processor, cause the communication apparatus to further perform: implementing the adaptive modulation on signals at subcarriers of the available band.

In some example embodiments, the parameters may comprise a subcarrier band, power allocation and a modulation order.

In some example embodiments, the parameters may be calculated according to a block coordinate descent approach.

In some example embodiments, the adaptive modulation may be a distance aware multicarrier adaptive modulation.

In some example embodiments, the at least one memory and the computer program code may be further configured to, with the at least one processor, cause the communication apparatus to further perform: transmitting, to the terminal device, mapping information on property of distance and band.

In a third aspect, disclosed is a communication method performed by a terminal device for transmission property sensitive band group, characterized in employing aware information of the terminal device, which may comprise channel state information, information on available band and positioning information of the terminal device. The communication method may comprise: determining the channel state information and the information on the available band and transmitting, to a network device, the channel state information and the information on the available band; and on request, determining the positioning information of the terminal device and transmitting, to the network device, the positioning information.

In some example embodiments, the information on the available band may be determined by: receiving, from the network device, mapping information on property of distance and band; determining a band of a transmission window based on the mapping information and a distance to the network device; identifying whether at the band a subcarrier is an available subcarrier or a virtual subcarrier which fails to support reliable symbol transmission; and determining the available band by excluding one or more virtual subcarriers from the band.

In some example embodiments, the aware information may further comprise a signal-to-noise ratio.

In some example embodiments, the channel state information may be calculated based on path loss, beam unaligned fading and multipath fading.

In a fourth aspect, disclosed is a communication method performed by a network device for transmission property sensitive band group, characterized in employing aware information of a terminal device, which may comprise channel state information, information on available band and positioning information of the terminal device. The communication method may comprise: receiving, from the terminal device, the channel state information and the information on the available band; collecting the positioning information of the terminal device; and calculating parameters for an adaptive modulation based on the aware information.

In some example embodiments, the aware information may further comprise a signal-to-noise ratio, and the communication method may further comprise: determining whether to adjust the parameters based on the aware information and a modulation granularity rule.

In some example embodiments, the modulation granularity rule may be associated with a distance to the terminal device, the signal-to-noise ratio and the available band.

In some example embodiments, the communication method may further comprise: implementing the adaptive modulation on signals at subcarriers of the available band.

In some example embodiments, the parameters may comprise a subcarrier band, power allocation and a modulation order.

In some example embodiments, the parameters may be calculated according to a block coordinate descent approach.

In some example embodiments, the adaptive modulation may be a distance aware multicarrier adaptive modulation.

In some example embodiments, the communication method may further comprise: transmitting, to the terminal device, mapping information on property of distance and band.

In a fifth aspect, disclosed is a communication apparatus for transmission property sensitive band group, characterized in employing aware information of a terminal device, which may comprise channel state information, information on available band and positioning information of the terminal device. The communication apparatus as the terminal device may comprise: means for determining the channel state information and the information on the available band and transmitting, to a network device, the channel state information and the information on the available band; and means for, on request, determining the positioning information of the terminal device and transmitting, to the network device, the positioning information.

In some example embodiments, the information on the available band may be determined by: means for receiving, from the network device, mapping information on property of distance and band; means for determining a band of a transmission window based on the mapping information and a distance to the network device; means for identifying whether at the band a subcarrier is an available subcarrier or a virtual subcarrier which fails to support reliable symbol transmission; and means for determining the available band by excluding one or more virtual subcarriers from the band.

In some example embodiments, the aware information may further comprise a signal-to-noise ratio.

In some example embodiments, the channel state information may be calculated based on path loss, beam unaligned fading and multipath fading.

In a sixth aspect, disclosed is a communication apparatus for transmission property sensitive band group, characterized in employing aware information of a terminal device, which may comprise channel state information, information on available band and positioning information of the terminal device. The communication apparatus as a network device may comprise: means for receiving, from the terminal device, the channel state information and the information on the available band; means for collecting the positioning information of the terminal device; and means for calculating parameters for an adaptive modulation based on the aware information.

In some example embodiments, the aware information may further comprise a signal-to-noise ratio, and the communication apparatus may further comprise: means for determining whether to adjust the parameters based on the aware information and a modulation granularity rule.

In some example embodiments, the modulation granularity rule may be associated with a distance to the terminal device, the signal-to-noise ratio and the available band.

In some example embodiments, the communication apparatus may further comprise: means for implementing the adaptive modulation on signals at subcarriers of the available band.

In some example embodiments, the parameters may comprise a subcarrier band, power allocation and a modulation order.

In some example embodiments, the parameters may be calculated according to a block coordinate descent approach.

In some example embodiments, the adaptive modulation may be a distance aware multicarrier adaptive modulation.

In some example embodiments, the communication apparatus may further comprise: means for transmitting, to the terminal device, mapping information on property of distance and band.

In a seventh aspect, a computer readable medium is disclosed. The computer readable medium may include instructions stored thereon for causing a communication apparatus as a terminal device to perform any communication method according to the third aspect.

In an eighth aspect, a computer readable medium is disclosed. The computer readable medium may include instructions stored thereon for causing a communication apparatus as a network device to perform any communication method according to the fourth aspect.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

Embodiments of the present disclosure provide an adaptive modulation mechanism for transmission property sensitive band group, for example, for THz channel communication as well as communication on a channel of frequency band higher than THz. THz channel characteristics are utilized to avoid impact on link adaption and thus avoid influence on system throughput according to the embodiments of the present disclosure.

Figure 1:
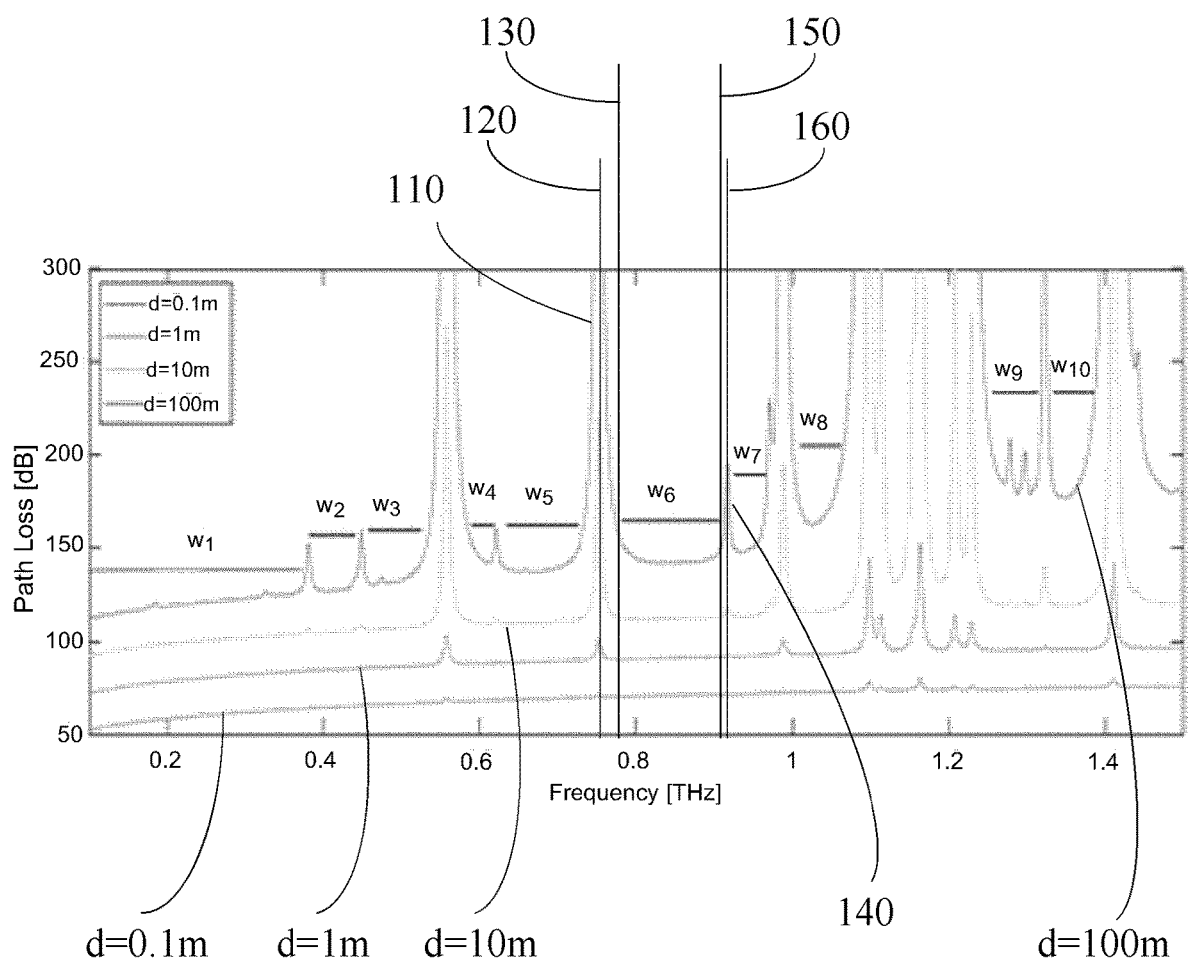
FIG. 1 shows an example of a band of a transmission window in THz band according to an embodiment of the present disclosure.

Due to the THz channel feature, an available band may be determined by the communication distance instead of being directly configured to terminal devices. FIG. 1 shows an example of a band of a transmission window in THz band according to an embodiment of the present disclosure. In the FIG. 1, the path loss in dB is shown for different transmission distances, for a standard atmosphere with 40% humidity. For transmission distances below one meter, where the number of water vapor molecules found along the path is small, the THz band behaves as a single transmission window several THz wide. As the transmission distance increases, for example, for the distance of 100 meters, molecular absorption lines define multiple transmission sub-windows, such as $w_1, w_2, \ldots w_n$, where n may be any integer, and any part or all of the sub-windows may be an example of the transmission property sensitive band group. As is shown in the FIG. 1, an absorption line may form a parabola with one peak and two falling edges. For example, the single transmission sub-window $w_6$ is between an absorption line 110 and an absorption line 140. The absorption line 110 has an absorption line center 120, which is at the peak of the absorption line 110. The absorption line 140 has an absorption line center 160, which is at the peak of the absorption line 140. For the single transmission sub-window $w_6$, the absorption line 110 has a falling edge 130 and the absorption line 140 has a falling edge 150.

The adaptive modulation mechanism according to the embodiments of the present disclosure can provide ultra-wideband applications in the THz band by utilizing the transmission window or sub-window dependent on distance and frequency. The adaptive modulation mechanism may be implemented in both base station (BS) side and user equipment (UE) side.

Figure 2:
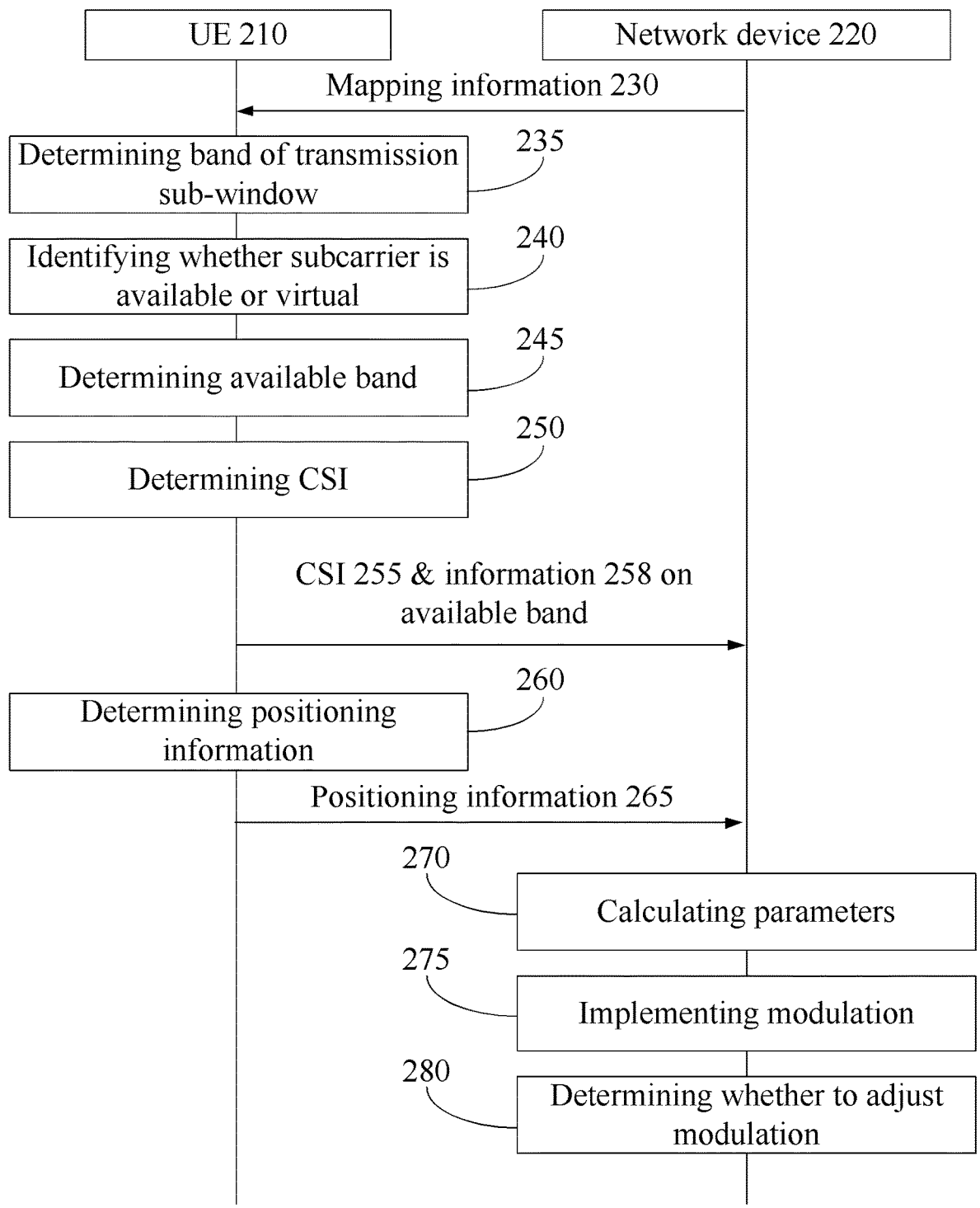
FIG. 2 shows an exemplary sequence diagram for providing an adaptive modulation mechanism for THz channel communication according to embodiments of the present disclosure.

FIG. 2 shows an exemplary sequence diagram for providing an adaptive modulation mechanism for THz channel communication according to embodiments of the present disclosure. Referring to the FIG. 2, a UE 210 may be any terminal device in a wireless communication network, and a network device 220 may be an example apparatus of network side, e.g., in a BS or may function as the BS. The UE 210 is associated with a cell the BS covers. The UE 210 and the network device 220 may carry out the communication for transmission property sensitive band group.

Referring to the FIG. 2, the network device 220 may transmit mapping information 230 on property of distance and band to the UE 210.

The mapping information 230 may assist the adaptive modulation mechanism to effectively maximize the THz channel utilization. In an embodiment, the mapping information, which may also be referred as to distance-aware information, may be listed in a distance-band mapping table (MT). The following Table 1 is shown as an example of MT.

| Item No. | MT contents | Explanation |
|---|---|---|
| 1 | Total frequency band and multiple transmission sub-window | For the specific single transmission sub-window, e.g., sub-window above 1 THz. The available band can go from 91.55 GHz down to 57.98 GHz when the communication distance increases from 1 m to 10 m. |

-continued

| Item No. | MT contents | Explanation |
|---|---|---|
| 2 | The lower and higher absorption line center frequencies in the single transmission sub-window | $f_c^{up}$, $f_c^{down}$. |
| 3 | The differential frequencies between the higher and lower absorption line center frequencies (the peak of the parabola) and the falling edge of the parabola at the higher and lower absorption line | $\Delta f_c^{up}$, $\Delta f_c^{down}$. |
| 4 | BS positioning information and ephemeris | If the BS is moving, e.g., an air-borne BS like an unmanned aerial vehicle (UAV) station, etc. The BS ephemeris may comprise a moving direction, a moving velocity, and a planned route of movement of the BS. |
| 5 | distance range and granularity of distance range | Distance range is from 1 m~100 m with granularity of 1 m. Or defining a Cascading level (hierarchical level) $M_h$ if the available band of a closer UE is integral multiple of a farther UE. The demodulator at UE is first to estimate the band $1/T_s'$ and based on the estimated factor $$m = \frac{T_s'}{T_s},$$ and then the received signal is demodulated as a $4^{M_h-m+1}$ quadrature amplitude modulation (QAM) at a $\frac{1}{mT_s}$ rate, where $M_h$ is the hierarchical level, m is an integer and $T_s$ is the inverse of the band available at the closest UE. |
| 6 | Humidity | Standard atmosphere with 40% |
| 7 | Pressure | 1 atm |
| 8 | Relevant parameters at a single sub-window i | $k_i^{up}$, $b_i^{up}$, $k_i^{down}$, $b_i^{down}$ |

It may be appreciated that in the present disclosure the element having identical expression in different formulas represents the identical physical quantity and/or has the identical physical meaning, without explicit indication to the contrary.

The contents of the MT will be described in detail later. It may be appreciated that the Table 1 above is an example of the MT. The MT may include other contents not shown in the Table 1, and some contents shown in the Table 1 may be omitted in the MT. In addition, not all contents in the MT need to be transmitted from the network device 220 to the UE 210. The mapping information 230 may be determined by the network device 220, and additionally or alternatively, the network device 220 may receive the mapping information 230 from other apparatus, e.g. an apparatus in core network (CN).

In an embodiment, the mapping information 230 may comprise a lower absorption line center frequency and a higher absorption line center frequency in the transmission sub-window, and a differential frequency between the lower absorption line center frequency and a falling edge frequency at a lower absorption line and a differential frequency between the higher absorption line center frequency and a falling edge frequency at a higher absorption line of the transmission sub-window. The lower absorption line center frequency and the higher absorption line center frequency in the transmission sub-window may be, for example, the item 2 in the Table 1, and the differential frequency between the lower absorption line center frequency and the falling edge frequency at the lower absorption line and the differential frequency between the higher absorption line center frequency and the falling edge frequency at the higher absorption line of the transmission sub-window may be, for example, the item 3 in the Table 1.

For a single transmission sub-window i, e.g. the $w_6$, the center transmission frequency in the single transmission sub-window i may be defined as $f_c$. The lower absorption line center frequency in the transmission sub-window i may be defined as $f_c^{down}$, for $w_6$, e.g., the frequency at the absorption line center 120. The higher absorption line center frequency in the transmission sub-window i may be defined as $f_c^{up}$, for $w_6$, e.g., the frequency at the absorption line center 160. The differential frequency between the higher absorption line center frequency (the peak of the parabola) and the falling edge of the parabola at the higher absorption line may be defined as $\Delta f^{up}$, for $w_6$, e.g., the $\Delta f^{up}$ may be the frequency at the absorption line center 160 minus the frequency at the falling edge 150. The differential frequency between the lower absorption line center frequency (the peak of the parabola) and the falling edge of the parabola at the lower absorption line may be defined as $\Delta f^{down}$, for $w_6$, e.g., the $\Delta f^{down}$ may be the frequency at the falling edge 130 minus the frequency at the absorption line center 120.

The $\Delta f^{up}$ and the $\Delta f^{down}$ may be calculated by the following formula (1).

$$\begin{cases} \Delta f^{down} = 100c \sqrt{\dfrac{1}{\dfrac{1}{(f_c/100c - b_1)^2 + b_2} + b_3 \dfrac{\ln(\gamma)}{d\mu}} - b_2} \\ \Delta f^{up} = 100c \sqrt{\dfrac{1}{\dfrac{1}{(f_c/100c - g_1)^2 + b_2} + g_3 \dfrac{\ln(\gamma)}{d\mu}} - g_2} \\ b_1 = 10.842 \text{ cm}^{-1}, b_2 = 0.0098 \text{ cm}^{-2}, b_3 = 4.49 \times 10^3 \pi \\ g_1 = 12.679 \text{ cm}^{-1}, g_2 = 12.679 \text{ cm}^{-1}, g_3 = 4.7 \times 10^2 \pi \end{cases} \quad (1)$$

Where c is the light speed, μ denotes the volume of the mixing ratio of water vapor and γ denotes the tolerance of the absorption loss deviation, cm is centimeter, d is the distance between the UE 210 and the network device 220, and $b_1$, $b_2$, $b_3$ and $g_1$, $g_2$, $g_3$ are parameters.

The $f_c^{up}$, $f_c^{down}$, $\Delta f^{up}$, $\Delta f^{down}$ at every granularity of the transmission distance on the single transmission sub-window i may be included in the mapping information 230 and transmitted to the UE 210.

Figure 3:
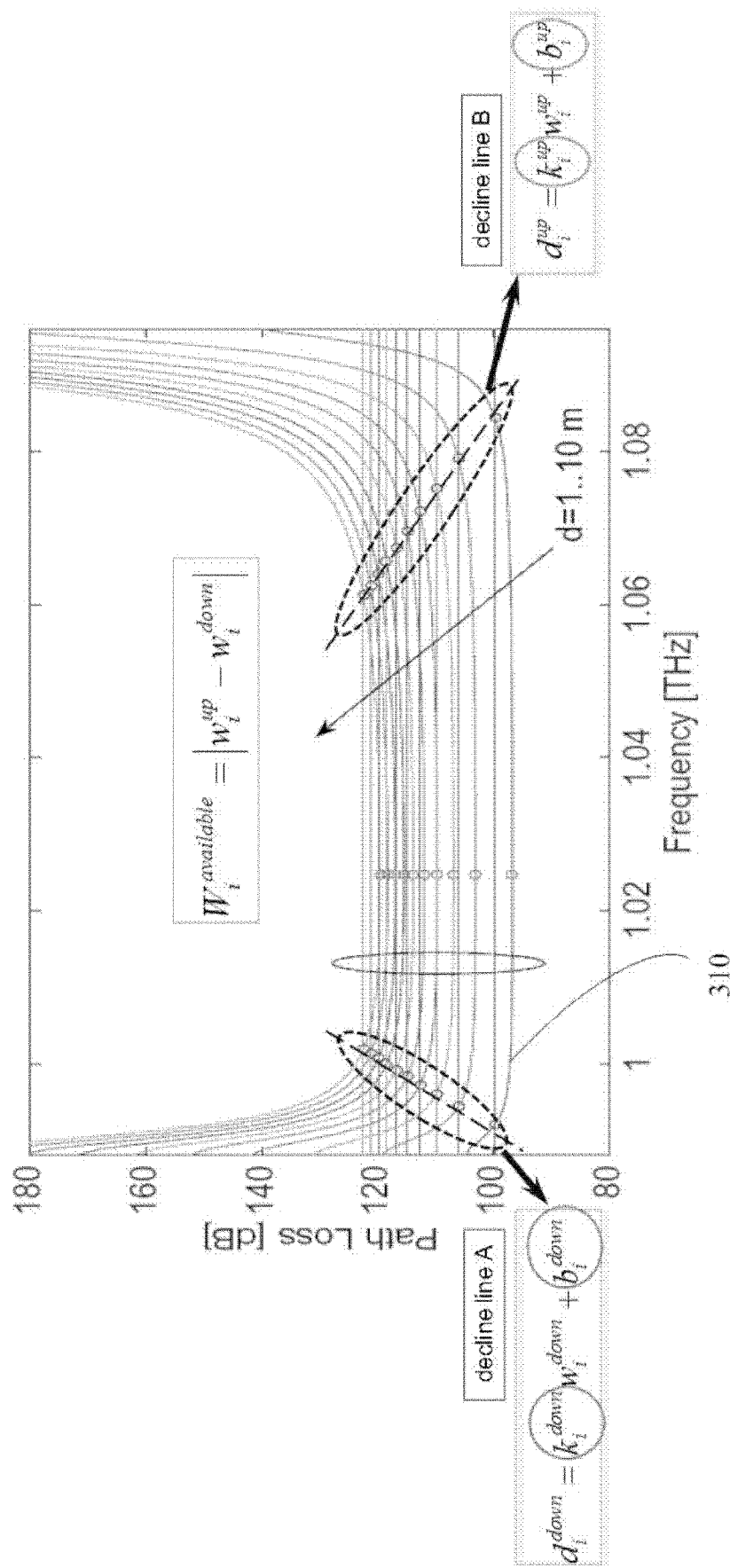
FIG. 3 shows an example band determination scheme in THz band according to an embodiment of the present disclosure.

FIG. 3 shows an example band determination scheme in THz band according to an embodiment of the present disclosure. In the FIG. 3, one single transmission sub-window i between two absorption lines is shown as an example. Curves such as a curve 310 are shown as path losses with respect to the frequency at different transmission distances.

The FIG. 3 and the following formula (2) depict lower and higher frequency decline lines A and B.

$$\begin{cases} d_i^{up} = k_i^{up} w_i^{up} + b_i^{up} \\ d_i^{down} = k_i^{down} w_i^{down} + b_i^{down} \\ d_i^{up} = d_i^{down} \end{cases} \quad (2)$$

where the $k_i^{up}$, $b_i^{up}$, $k_i^{down}$, $b_i^{down}$ are relevant parameters of the lower and higher frequency decline lines A and B, in which the $k_i^{up}$ and $b_i^{up}$ are parameters of the higher frequency decline line B and the $k_i^{down}$ and $b_i^{down}$ are parameters of the lower frequency decline line A, and the $d_i^{up}$ and $d_i^{down}$ are the transmission distance. The $k_i^{down}$ may be the gradient of the decline line A, and the $b_i^{down}$ may be the intercept of the lower frequency decline line A. The $k_i^{up}$ may be the gradient of the decline line B, and the $b_i^{up}$ may be the intercept of the higher frequency decline line B.

In an embodiment, the mapping information 230 may comprise the parameters of the lower and higher frequency decline lines of the transmission sub-window. The parameters may be, for example, the $k_i^{up}$, $b_i^{up}$, $k_i^{down}$, $b_i^{down}$ which may be, e.g. the item 8 in the Table 1. As is mentioned above, the $k_i^{up}$ and $b_i^{up}$ are parameters of the higher frequency decline line B and the $k_i^{down}$ and $b_i^{down}$ are parameters of the lower frequency decline line A. In a case where the mapping information 230 includes the relevant parameters of lower and higher frequency decline lines A and B instead of, e.g. the $f_c^{up}$, $f_c^{down}$, $\Delta f^{up}$, $\Delta f^{down}$, the overhead of the communication system may be reduced.

In an embodiment, the mapping information 230 may comprise positioning information and/or ephemeris information of the network device 220. The positioning information and/or the ephemeris information may be, e.g., the item 4 in the Table 1. The positioning information of the network device 220 may be used by the UE 210 to calculate the distance between the UE 210 and the network device 220, if the network device 220 is stationary. In a case where the network device 220 is moving, for example, in an air-borne BS such as an UAV station, etc., the mapping information 230 may further comprise the ephemeris information of the network device 220 such that the UE 210 may calculate the distance between the UE 210 and the network device 220 based on the mapping information 230. The ephemeris information of the network device 220 is also the ephemeris information of the BS and may comprise a moving direction, a moving velocity, and a planned route of movement of the BS.

In an embodiment, the mapping information 230 may optionally comprise a distance range and/or a granularity of the distance range. The distance range and the granularity may be, for example, the item 5 in the Table 1. Alternatively or additionally, the mapping information 230 may optionally comprise a total frequency band and multiple transmission sub-window, e.g. the item 1 in the Table 1, humidity, e.g., the item 6 in the Table 1, and/or pressure, e.g., the item 7 in the Table 1.

In an embodiment, the mapping information 230 may be transmitted in a synchronization signal block (SSB). In an embodiment, the SSB may be a synchronization signal and physical broadcast channel (PBCH) block.

Referring back to the FIG. 2, in an operation 235, the UE 210 may determine a band of a transmission window based on the mapping information 230 and a distance between the UE 210 and the network device 220. The UE 210 may have global navigation satellite system (GNSS) positioning ability. As is described above, the UE 210 may calculate the distance between the UE 210 and the network device 220 based on the positioning information and/or ephemeris information of the network device 220. Because of the ambiguity at the higher and lower absorption line center frequencies on THz, the UE 210 identifies UE-specific band and subcarriers.

The band of a transmission sub-window may be denoted as W(d), representing the band W is at the transmission distance d, which may be the distance between the UE 210 and the network device 220. There are two solutions, one option (opt.1) may be based on the formulas (1) and (3) for high accuracy, another option (opt.2) may be based on the formulas (2) and (3) for low complexity.

$$\begin{cases} W(d) = f_c^{up}(d) - \Delta f^{up}(d) - \\ \quad (f_c^{down}(d) + \Delta f^{down}(d)) & \text{opt. 1(high accuracy)} \\ W(d) = W_i^{available} = |w_i^{up} - w_i^{down}| & \text{opt. 2(low complexity)} \\ \text{s.t. } |h(f + \Delta f) - h(f)|^2 \le \varepsilon \end{cases} \quad (3)$$

$$N = \left\lfloor \frac{W(d)}{\Delta f} \right\rfloor \quad (4)$$

For the opt.1, the $f_c^{up}$, $f_c^{down}$, $\Delta f^{up}$, $\Delta f^{down}$ may be at the transmission distance d and denoted as $f_c^{up}(d)$, $f_c^{down}(d)$, $\Delta f^{up}(d)$ and $\Delta f^{down}(d)$, respectively.

For the opt.2, because the UE 210 may have calculated the $d_i^{up}$ and $d_i^{down}$ according to the formula (2), the UE 210 may calculate the $w_i^{up}$ and $w_i^{down}$, where the $w_i^{up}$ and $w_i^{down}$ may be briefly utilized to be the higher limit and the lower limit of the available band of the transmission sub-window i. The UE 210 may thus calculate the $w_i^{available}$ as the available band of the transmission sub-window i according to the formula (3).

The band of a subcarrier is denoted as Δf, f is the current frequency, h(f) represents the channel impulse response at a frequency f, and $|h(f+\Delta f)-h(f)|^2 \le \varepsilon$ means that the subcarriers are frequency flat.

The above formula (4) is to calculate the number of subcarriers of the sub-window, N=K+1, where K is the maximum index of the subcarrier, and the subcarrier index is 0, 1, . . . , K.

The opt.1 may make sufficient use of distance-band mapping information 230, and the opt.2 may effectively use the distance-band mapping information 230 with low complexity, because the distance-frequency related straight lower and higher frequency decline lines A and B may be transmitted instead of the $f_c^{up}$, $f_c^{down}$, $\Delta f^{up}$, $\Delta f^{down}$, at every granularity of the transmission distance.

The band of the transmission window, e.g., the sum of the bands of the sub-windows, such as $w_1$, $w_2$, ... $w_{10}$, may be determined by the determination of the band of each transmission sub-window.

As is described above, according to the formula (3), $w_i^{up}$ and $w_i^{down}$ may be briefly utilized to be the higher limit and the lower limit of the available band of the transmission sub-window i, and because the sub-window may comprise a plurality of subcarriers, alternatively or additionally, in an operation 240, the UE 210 may identify whether at the band a subcarrier is an available subcarrier or a virtual subcarrier which fails to support reliable symbol transmission.

In an embodiment, the virtual subcarrier may be the subcarrier in which the instantaneous path loss is greater than a predetermined threshold, denoted as $T_{threshold}$. The following formula (5) may be used to identify the virtual subcarrier.

$$\begin{cases} -20\log_{10}(h(k)) > T_{threshold} = \frac{P_t}{N} + G_t + G_r - (SNR_b^{average} + P_n) \\ SNR_b^{average} = \frac{(1 - 2P_b^{BPSK})^2}{1 - (1 - 2P_b^{BPSK})^2} \end{cases} \quad (5)$$

Where $P_t$ is the fixed total transmission power which can be achieved, $P_n$ represents the average noise power at the k-th subcarrier at the UE 210, $G_t$ and $G_r$ represent the transmit and receive antenna gain, respectively, whereas $SNR_b^{average}$ stands for the average signal-to-noise ratio (SNR), which is required in order to achieve a bit error rate (BER) denoted as $P_b^{BPSK}$, and h(k) represents the channel impulse response of the k-th subcarrier.

In a case where the h(k) satisfies the formula (5), the k-th subcarrier is identified as the virtual subcarrier, otherwise the k-th subcarrier is identified as the available subcarrier.

The operation 240 is described above with respect to the sub-window, and it may be appreciated each subcarrier at the band of the transmission window may be identified by performing the operation 240 for each sub-window.

Then, in an operation 245, the UE 210 may determine the available band by excluding one or more virtual subcarriers from the band. Thus, the UE 210 may determine the information 258 on the available band. The information 258 on the available band may relate to the transmission window and the respective transmission sub-windows.

The UE 210 and the network device 220 may employ aware information of the UE 210, and the aware information may include channel state information (CSI) 255, the information 258 on the available band and positioning information of the UE 210.

In an operation 250, the UE 210 may determine CSI 255 on available subcarriers.

In an embodiment, the CSI 255 may be determined in establishment of a channel model. For example, the CSI 255 may be calculated based on path loss, beam unaligned fading and multipath fading. For example, the path loss (including molecular absorption), the beam unaligned fading and the multipath fading may be included in the channel mode to better characterize the THz channel. The channel model, which may be referred as to the CSI 255, may be expressed as the following formula (6).

$$h = h_l h_p h_f \quad (6)$$

Where $h_l$ is the path loss, $h_p$ is the beam unaligned fading caused by non-alignment of transmitting and receiving beams, and $h_f$ is multi-path fading.

The $h_l$ may be expressed as the following formulas (7) and (8).

$$h_l = \left(\frac{c}{4\pi f d}\right)^2 G_T G_R \tau(f, d) = \quad (7)$$

$$\left(\frac{c}{4\pi f d}\right)^2 G_T G_R \exp(-d(y_1(f, \mu) + y_2(f, \mu) + g(f, \mu)))$$

Where $$\begin{cases} y_1(f, \mu) = \dfrac{A(\mu)}{B(\mu) + \left(\dfrac{f}{100c} - c_1\right)^2} \\ y_2(f, \mu) = \dfrac{C(\mu)}{D(\mu) + \left(\dfrac{f}{100c} - c_2\right)^2} \\ g(f) = p_1 f^3 + p_2 f^2 + p_3 f + p_4 \\ A(\mu) = 0.2205\,\mu(0.1203\,\mu + 0.0294) \\ B(\mu) = 0.4093\,\mu + 0.0925)^2 \\ C(\mu) = 2.014\,\mu(0.1702\,\mu + 0.0303) \\ D(\mu) = (0.539\,\mu + 0.0956)^2 \\ \mu = \dfrac{\phi}{100} \dfrac{p_w(T, p)}{p} \\ p_w(T, p) = w_1(w_2 + w_3 p)\exp\left(\dfrac{w_4 T}{w_5 + T}\right) \\ w_1 = 6.1121, w_2 = 1.0007, w_3 = 3.46 \times 10^{-8}, \\ \quad w_4 = 17.502, w_5 = 240.97 \\ c_1 = 10.853\ \text{cm}^{-1}, c_2 = 12.664\ \text{cm}^{-1} \\ p_1 = 5.54 \times 10^{-37}\text{Hz}^{-3}, p_2 = -3.94 \times 10^{-25}\text{Hz}^{-2}, \\ p_3 = 9.06 \times 10^{-14}\text{Hz}^{-1}, p_4 = -6.36 \times 10^{-3} \end{cases} \quad (8)$$

Where d is the distance between the UE 210 and the network device 220, $\phi$ and p respectively stand for the relative humidity and the pressure, $p_w(T, p)$ is the saturated water vapor partial pressure in temperature T, c is the light speed, and f is the center transmission frequency in the band of the transmission window.

The $h_p$ may be expressed as the following formula (9).

$$h_p = A_0 \exp\left(-\frac{2d^2}{w_{eq}^2}\right) \quad (9)$$

Where $$A_0 = (\text{erf}(u))^2, \; w_{eq}^2 = w_d^2 \frac{\text{erf}(u)}{2u \exp(-u^2)}, \text{ and } u = \frac{\sqrt{\pi}\,a}{\sqrt{2}\,w_d},$$

d is the distance between the UE 210 and the network device 220, and the parameters a and $w_d$ are the radius of the receiver effective area and the transmit beam footprint at distance d.

The $h_f$ may obey α-μ mode, which may be expressed as the following formula (10).

$$f_{h_f}(x) = \frac{\alpha \mu^\mu}{\hat{h}_f^{\alpha\mu} \Gamma(\mu)} x^{\alpha\mu-1} \exp\left(-\frac{\mu x^\alpha}{\hat{h}_f^\alpha}\right) \tag{10}$$

where x is the random variable in the probability density function and it may be appreciated that the α-μ distribution may be a generalized form of many fading distributions e.g., Rayleigh (α=2, μ=1), Nakagami-m (α=2, and μ is the fading parameter) and so on.

According to A. A. Boulogeorgos, E. N. Papasotiriou and A. Alexiou, "Analytical Performance Assessment of THz Wireless Systems," in IEEE Access, vol. 7, pp. 11436-11453, 2019, doi: 10.1109/ACCESS.2019.2892198, a joint distribution function of $h_{fp}$, may be expressed as the following formula (11).

$$F_{|h_{fp}|}(x) = 1 - \frac{1}{\alpha} \frac{x^2}{\hat{h}_f^{\gamma^2}} \frac{\gamma^2}{A_o^2} \times \sum_{k=0}^{\mu-1} \frac{\mu^{\frac{z^2}{\alpha}}}{k!} \Gamma\left(\frac{\alpha k - r^2}{\alpha}, \mu \frac{x^\alpha}{\hat{h}_f^\alpha} A_o^{-\alpha}\right) \tag{11}$$

Where $F_{|h_{fp}|}(x)$ represents joint cumulative density function (CDF) of $h_f$ and $h_p$, parameter $$\gamma = \frac{w_{eq}}{2\sigma_s}$$

represents the fading parameter, μ and $\hat{h}_f$ represent the normalized fading amplitude and the root mean value of α, respectively, and $\sigma_s^2$ represents the variance of the pointing error displacement at the receiving side, e.g., the network device 220 for uplink or the UE 210 for downlink.

The UE 210 may transmit the CSI 255 and the information 258 on the available band to the network device 220.

In an operation 260, the UE 210 may, on request, determine positioning information 265 of the UE 210. The request may come from the network device 220 and/or the CN or may be specified in a specification. The operation 260 and the operation 250 may be performed separately as different operations or be performed as one operation. The CSI 255, the information 258 and the positioning information 265 may be transmitted separately to the network device 220 or may be included in the aware information and transmitted together to the network device 220.

The network device 220 may collect the positioning information 265 from the UE 210. Alternatively, the network device 220 may collect positioning information of the UE 210 by measuring the positioning information of the UE 210 with the assistance from other BSs and/or by determining the positioning information of the UE 210 based on historical positioning information of the UE 210.

Receiving the CSI 255 and the information 258 on the available band and collecting the positioning information of the UE 210, in an operation 270, the network device 220 may calculate parameters for an adaptive modulation based on the aware information.

In an embodiment, the adaptive modulation may be distance aware multicarrier (DAMC) adaptive modulation. Additionally, in an embodiment, the parameters may comprise a subcarrier band, power allocation and a modulation order.

For example, according to the information 258 on the distance-based available band of the transmission window in the aware information, on the network device 220 side, the adaptive modulation problem can be modeled as the following optimization problem expressed as the following formula (12).

$$P: \max_{f\{\Delta f, M_{m,n}, P_{m,n}\}} R = \sum_{m=1}^{M(d)} \sum_{n=1}^{N_m} \Delta f_{m,n} \log_2 M_{m,n} \tag{12}$$

s.t.

$$C1: \sum_{m=1}^{M(d)} \sum_{n=1}^{N_m} \Delta f_{m,n} \leq B(f, d)$$

$$C2: \sum_{n=1}^{N_m} \Delta f_{m,n} \leq B_m(f, d), \forall m = 1, 2, \ldots, M(d)$$

$$C3: \sum_{m=1}^{M(d)} \sum_{n=1}^{N_m} P_{m,n}(\gamma_{m,n}) \leq P_T$$

$$C4: M(\gamma_{m,n}) \leq 1 + \frac{1.5 h_{m,n} P_{m,n}(\gamma_{m,n})}{-\ln(5 P_{b,m,n}) N_0 \Delta f_{m,n}}$$

$$C5: \Delta f_{m,n} \geq 0,$$

$$C6: P_{m,n}(\gamma_{m,n}) \geq 0$$

$$C7: M_{m,n} \in Z^+$$

Where R is data rate, C1 to C7 are constraint conditions, $\Delta f_{m,n}$ is the subcarrier band of the n-th available subcarrier of the m-th sub-window, $M_{m,n}$ is the modulation order of the n-th available subcarrier of the m-th sub-window, and $P_{m,n}$ is the power allocation of the n-th available subcarrier of the m-th sub-window. It may be appreciated that other element with subscripts m and n means the element is related to the n-th available subcarrier of the m-th sub-window. $M_{(d)}$ is the number of the sub-windows, $N_m$ is the number of available subcarriers of the m-th sub-window, B(f, d) is the available band at distance d and frequency f, $B_m$(f, d) is the available band of the m-th sub-window at distance d and frequency f, $\gamma_{m,n}$ is the index m, n, $P_T$ is transmission power, $h_{m,n}$ is the CSI 255 of the n-th available subcarrier of the m-th sub-window, $P_{b,m,n}$ is the BER requirement in the n-th available subcarrier of the m-th sub-window, $N_0$ is the power spectral density of noise, and $Z^+$ is the set of positive integers.

The parameters for the adaptive modulation may be calculated based on the formula (12) through iteration. The above optimization problem expressed in the formula (12) belongs to non-convex optimization problem due to the coupling of optimization variables $\Delta f_{m,n}$ and $M_{m,n}$ in the objective function and constraint condition C4. Alternatively or additionally, in an embodiment, the parameters may be calculated according to a block coordinate descent (BCD) approach.

For example, the optimization problem expressed in the formula (12) may be transformed into convex optimization problem e.g. by adopting the BCD. The basic principle of BCD may be expressed as the following formula (13).

$$f^{(0)} \to \{P^{(0)}, M^{(0)}\} \to \ldots \to f^{(n-1)} \to \tag{13}$$

$$\{P^{(n1)}, M^{(n-1)}\} \to f^{(n)} \to \{P^{(n)}, M^{(n)}\} \to \ldots \to f^* \to \{P^*, M^*\}$$

Where the superscripts represent the number of times of iteration, and f*, p*, and M* are the optimal values of the subcarrier band, the power allocation, and the modulation order, respectively.

For example, in the BCD approach, the network device 220 may first determine a feasible initial solution of $\Delta f_{m,n}$, then fix the optimization variable $\Delta f_{m,n}$, and jointly optimize $M_{m,n}$ and $P_{m,n}$. Then, the last optimization of $M_{m,n}$ and $P_{m,n}$ may be taken as the initial solution, and the optimization may be carried out for $\Delta f_{m,n}$, by iteration, until the difference of the two data rates is less than a predetermined threshold, and the iteration may be terminated. According to the principle of BCD approach, in each iteration, the data rate will be larger than the last, therefore, the BCD approach is convergent. According to the BCD approach, the original optimization problem P may be simplified into optimization sub-problems P1 and P2, expressed as the following formulas (14) and (15), respectively.

$$P1: \max_{\{M_{m,n}, P_{m,n}\}} R = \sum_{m=1}^{M(d)} \sum_{n=1}^{N_m} \Delta f_{m,n} \log_2 M_{m,n} \quad (14)$$

s.t.

$$C1: \sum_{m=1}^{M(d)} \sum_{n=1}^{N_m} P_{m,n}(\gamma_{m,n}) \leq P_T$$

$$C2: M(\gamma_{m,n}) \leq 1 + \frac{1.5 h_{m,n} P_{m,n}(\gamma_{m,n})}{-\ln(5 P_{b,m,n}) N_0 \Delta f_{m,n}}$$

$$C3: P_{m,n}(\gamma_{m,n}) \geq 0$$

$$C4: M_{m,n} \in Z^+$$

$$P2: \max_{\{\Delta f_{m,n}\}} R = \sum_{m=1}^{M(d)} \sum_{n=1}^{N_m} \Delta f_{m,n} \log_2 M_{m,n} \quad (15)$$

s.t.

$$C1: \sum_{m=1}^{M(d)} \sum_{n=1}^{N_m} \Delta f_{m,n} \leq B(f, d)$$

$$C2: \sum_{n=1}^{N_m} \Delta f_{m,n} \leq B_m(f, d) \forall m = 1, 2, \ldots, M(d)$$

$$C3: M(\gamma_{m,n}) \leq 1 + \frac{1.5 h_{m,n} P_{m,n}(\gamma_{m,n})}{-\ln(5 P_{b,m,n}) N_0 \Delta f_{m,n}}$$

$$C1: \Delta f_{m,n} \geq 0,$$

In the BCD approach, when $\Delta f_{m,n}$ is fixed, the above optimization problems may be simplified to convex optimization problems, which can be directly solved by Lagrange duality method; and when $M_{m,n}$ and $P_{m,n}$ are fixed, the above optimization problem may be simplified to the optimization problem about a single variable, which also belongs to the convex optimization problem.

The flow of the BCD approach based on distance modulation may be summarized as below.

Input: THz channel h, available band of the transmission window at distance d, number of subcarriers per sub-window, initial subcarrier band $f^{(0)}$ and convergence threshold $\zeta$.

Output: optimal subcarrier band f*, optimal power allocation p*, and optimal modulation order M*.

The flow may comprise:

01: Set the subcarrier band as $f^{(0)}$, and solve the optimization sub-problem P1;

02: Fix the optimal power allocation and modulation order obtained by optimizing sub-problem P1, and solve the optimization sub-problem P2.

03: The optimal subcarrier band obtained by optimizing P2 sub-problem is substituted into the optimization sub-problem P1 to solve the optimization sub-problem P1.

04: The power allocation and modulation order obtained from the optimization sub-problem P1 are substituted again into the optimization sub-problem P2.

05: In this way, the sub-problems P1 and P2 are optimized successively until the difference of data rates is less than the convergence threshold.

06: Finally, the power allocation, subcarrier band and modulation order are the optimal values, and the data rate is the maximum data rate.

When the parameters for the adaptive modulation are calculated, in an operation 275, the network device 220 may implement the adaptive modulation on signals at subcarriers of the available band.

In a case where the UE 210 moves, the distance between the UE 210 and the network device 220 may change. In this case, the available band may also change, and the parameters for the adaptive modulation may perhaps need to be changed. For example, the UE 210 may report the aware information periodically, and the aware information may further comprise a SNR. Alternatively the network device 220 may calculate the SNR based on the CSI 255

In an operation 280, the network device 220 may determine whether to adjust the parameters based on the aware information and a modulation granularity rule. In an embodiment, the modulation granularity rule may be associated with the distance d between the UE 210 and the network device 220, the SNR and the available band B. An example modulation granularity rule may be designed as the following Table 2, where the expression (d) refers to the value at the distance d.

TABLE 2

Modulation granularity rules

| d | SNR | Available band | Adjust or not |
|---|---|---|---|
| Increase ($\Delta d > 0$) | $\Delta SNR \geq 0.5$ dB | Arbitrary | Adjust |
| | $\Delta SNR \leq 0.5$ dB | $|B(d + \Delta d) - B(d)| \leq \min_{m,n}(\Delta f_{m,n}(d))$ | Not adjust |
| | | $|B(d + \Delta d) - B(d)| \geq \min_{m,n}(\Delta f_{m,n}(d))$ | Adjust |
| Remain unchanged ($\Delta d = 0$) | $\Delta SNR \geq 0.5$ dB | unchanged | Adjust |
| | $\Delta SNR \leq 0.5$ dB | unchanged | Not adjust |
| Decrease ($\Delta d < 0$) | $\Delta SNR \geq 0.5$ dB | Arbitrary | Adjust |
| | $\Delta SNR \leq 0.5$ dB | $|B(d + \Delta d) - B(d)| \leq \min_{m,n}(\Delta f_{m,n}(d))$ | Not adjust |
| | | $|B(d + \Delta d) - B(d)| \geq \min_{m,n}(\Delta f_{m,n}(d))$ | Adjust |

Under the above modulation granularity rules, when the UE 210 moves, the probability of SNR difference no smaller than the threshold $\gamma_{th}$ may be calculated as the following formula (16).

$$P = Pr(|\gamma(t) - \gamma(t+\Delta t)| \geq \gamma_{th}) \quad (16)$$

$$= Pr\left(\left|\begin{array}{c}\frac{1.5h_{m,n}^2(t,d)P_{m,n}(\gamma_{m,n})}{-\ln(5P_{b,m,n})N_0\Delta f_{m,n}(d)} - \\ \frac{1.5h_{m,n}^2(t+\Delta t, d+\Delta d)P_{m,n}(\gamma_{m,n})}{-\ln(5P_{b,m,n})N_0\Delta f_{m,n}(d+\Delta d)}\end{array}\right| \geq \gamma_{th}\right)$$

$$= Pr\left(\begin{array}{c}(1.5P_{m,n}(\gamma_{m,n})\Delta f_{m,n}(d+\Delta d) - \\ 1.5\Delta f_{m,n}(d)P_{m,n}(\gamma_{m,n}))h_{m,n}^2(t,d) \\ -3\Delta f_{m,n}(d)P_{m,n}(\gamma_{m,n})\varepsilon h_{m,n}(t,d) \geq \\ -\gamma_{th}\ln(5P_{b,m,n})N_0\Delta f_{m,n}(d)\Delta f_{m,n}(d+\Delta d) + \\ 1.5\Delta f_{m,n}(d)\varepsilon^2 P_{m,n}(\gamma_{m,n})\end{array}\right) +$$

$$Pr\left(\begin{array}{c}(1.5P_{m,n}(\gamma_{m,n})\Delta f_{m,n}(d+\Delta d) - \\ 1.5\Delta f_{m,n}(d)P_{m,n}(\gamma_{m,n}))h_{m,n}^2(t) - \\ 3\Delta f_{m,n}(d)\varepsilon P_{m,n}(\gamma_{m,n})h_{m,n}(t,d) \leq \\ 1.5\Delta f_{m,n}(d)\varepsilon^2 P_{m,n}(\gamma_{m,n}) + \\ \gamma_{th}\ln(5P_{b,m,n})N_0\Delta f_{m,n}(d)\Delta f_{m,n}(d+\Delta d)\end{array}\right)$$

$$= P_1 + P_2$$

Where $\gamma$ is the SNR value, (t) represents the value at the time t, $h(t+\Delta t, d+\Delta d) = h(t,d)+\varepsilon$, $h(t+\Delta t, d+\Delta d)$ and $h(t,d)$ denote the channel power gain at the distance $d+\Delta d$ and time $t+\Delta t$ as well as distance d and time t, respectively. $h(t,d)$ and $\varepsilon$ are independent of each other, and $\varepsilon \sim N(0, \sigma_n^2)$, where $\sigma_n^2$ is the variance of the error variable. It is noted that the P, $P_1$ and $P_2$ representing probabilities in the formula (16) and following formulas are different from P relating the power allocation and P1 and P2 relating optimization sub-problems in preceding formulas. It is also noted that $\gamma$ relating to SNR in the formula (16) and following formulas are different from $\gamma$ in preceding formulas.

Auxiliary parameters expressed as the following formula (17) may be introduced for calculating probability of adjusting parameters for the adaptive modulation in different scenarios.

$$\begin{cases} A = 1.5P_{m,n}(\gamma_{m,n})(\Delta f_{m,n}(d+\Delta d) - \Delta f_{m,n}(d)) \\ B = 3\Delta f_{m,n}(d)P_{m,n}(\gamma_{m,n})\varepsilon \\ C = -\gamma_{th}\ln(5P_{b,m,n})N_0\Delta f_{m,n}(d)\Delta f_{m,n}(d+\Delta d) + \\ \quad 1.5\Delta f_{m,n}(d)\varepsilon^2 P_{m,n}(\gamma_{m,n}) \\ C2 = 1.5\Delta f_{m,n}(d)\varepsilon^2 P_{m,n}(\gamma_{m,n}) + \\ \quad \gamma_{th}\ln(5P_{b,m,n})N_0\Delta f_{m,n}(d)\Delta f_{m,n}(d+\Delta d) \\ \Delta = B^2 - 4AC \\ \quad = 6P_{m,n}(\gamma_{m,n})\Delta f_{m,n}(d)\Delta f_{m,n}(d+\Delta d) \\ \quad [\gamma_{th}\ln(5P_{b,m,n})N_0(\Delta f_{m,n}(d) - \Delta f_{m,n}(d+\Delta d)) + \\ \quad 1.5\varepsilon^2 P_{m,n}(\gamma_{m,n})] \\ \Delta 2 = B^2 - 4AC2 \\ \quad = 6P_{m,n}(\gamma_{m,n})\Delta f_{m,n}(d)\Delta f_{m,n}(d+\Delta d) \\ \quad [\gamma_{th}\ln(5P_{b,m,n})N_0\{\Delta f_{m,n}(d+\Delta d) - \Delta f_{m,n}(d)\} + \\ \quad 1.5\varepsilon^2 P_{m,n}(\gamma_{m,n})] \end{cases} \quad (17)$$

The first scenario: $\Delta d > 0$, $\Delta f_{m,n}(d) - \Delta f_{m,n}(d+\Delta d) > 0$, $A < 0$, $C > 0$, $\Delta 2 > 0$.

The calculation of $P_1$ may be performed as following:
when $\Delta \leq 0$, $P_1 = 0$; and
when $\Delta > 0$, $h_{m,n} > 0$, $P_1 = Pr(h_{m,n} > 0) = 1 - F_{h_{m,n}}(0)$, where $F_{h_{m,n}}$ is the CDF of $h_{m,n}$.

The calculation of $P_2$ may be performed as following:
when $C2 > 0$, $h_{m,n} > 0$, $P_2 = 1$; and
When $C2 < 0$, $\varepsilon$ satisfies $$-\sqrt{\frac{-\gamma_{th}\ln(5P_{b,m,n})N_0\Delta f_{m,n}(d)\Delta f_{m,n}(d+\Delta d)}{1.5\Delta f_{m,n}(d)P_{m,n}(\gamma_{m,n})}} <$$

$$\varepsilon < \sqrt{\frac{-\gamma_{th}\ln(5P_{b,m,n})N_0\Delta f_{m,n}(d)\Delta f_{m,n}(d+\Delta d)}{1.5\Delta f_{m,n}(d)P_{m,n}(\gamma_{m,n})}}$$

and $h_{m,n}$ meets $$h_{m,n} > \frac{B + \sqrt{B^2 + 4AC2}}{2A},$$

$P_2$ may thus be calculated as the following formula (18).

$$P_2 = Pr\left(h_{m,n} > \frac{B - \sqrt{B^2 + 4AC2}}{2A}\right) \quad (18)$$

$$= \int \sqrt{\frac{-\gamma_{th}\frac{\ln(5P_{b,m,n})N_0\Delta f_{m,n}(d+\Delta d)}{1.5P_{m,n}(\gamma_{m,n})}}{\sqrt{\frac{-\gamma_{th}\frac{\ln(5P_{b,m,n})N_0\Delta f_{m,n}(d+\Delta d)}{1.5P_{m,n}(\gamma_{m,n})}}}}}$$

$$\left(1 - F_{h_{m,n}}\left(\frac{B - \sqrt{B^2 + 4AC2}}{2A}\right)\right)f_\varepsilon(\varepsilon)d\varepsilon$$

where $f_\varepsilon(\varepsilon)d\varepsilon$ is the probability density function (PDF) of the channel error variable.

To sum up, the total probability $P_{total}$ of adjusting parameters for the adaptive modulation under the first scenario may be written as the following formula (19).

$$P_{total} = P_1 + P_2 + \frac{1}{2}(1 - P_1 - P_2) \quad (19)$$

The second scenario: $\Delta d < 0$, $\Delta f_{m,n}(d) - \Delta f_{m,n}(d+\Delta d) < 0$, $A > 0$, $C > 0$, $\Delta > 0$.

The calculation of $P_1$ may be performed as following:
When $h_{m,n}$ meets $$h_{m,n} \geq \frac{B + \sqrt{B^2 + 4AC}}{2A},$$

$P_1$ may be calculated as the following formula (20).

$$P_1 = Pr\left(h_{m,n} \geq \frac{B + \sqrt{B^2 + 4AC}}{2A}\right) = \quad (20)$$

$$\int_{-\infty}^{+\infty}\left(1 - F_{h_{m,n}}\left(\frac{B + \sqrt{B^2 + 4AC}}{2A}\right)\right)f_\varepsilon(\varepsilon)d\varepsilon$$

The calculation of $P_2$ may be performed as following:

a. when C2>0, and Δ2>0, ε satisfies the following formula (21).

$$-\infty < \varepsilon < -\sqrt{\frac{-\gamma_{th}\ln(5P_{b,m,n})N_0\Delta f_{m,n}(d+\Delta d)}{1.5P_{m,n}(\gamma_{m,n})}} \quad (21)$$

and $$\sqrt{\frac{-\gamma_{th}\ln(5P_{b,m,n})N_0\Delta f_{m,n}(d+\Delta d)}{1.5P_{m,n}(\gamma_{m,n})}} < \varepsilon < +\infty$$

Therefore, $P_2$ may be calculated as the following formula (22).

$$P_2 = Pr\left(0 < h_{m,n} < \frac{B + \sqrt{B^2+4AC2}}{2A}\right) \quad (22)$$

$$= \int_{-\infty}^{+\infty} F_{h_{m,n}}\left(\frac{B+\sqrt{B^2+4AC2}}{2A}\right)f_\varepsilon(\varepsilon)d\varepsilon$$

$$= \int_{-\infty}^{-\sqrt{\frac{-\gamma_{th}\ln(5P_{b,m,n})N_0\Delta f_{m,n}(d+\Delta d)}{1.5P_{m,n}(\gamma_{m,n})}}} F_{h_{m,n}}\left(\frac{B+\sqrt{B^2+4AC2}}{2A}\right)f_\varepsilon(\varepsilon)d\varepsilon +$$

$$\int_{\sqrt{\frac{-\gamma_{th}\ln(5P_{b,m,n})N_0\Delta f_{m,n}(d+\Delta d)}{1.5P_{m,n}(\gamma_{m,n})}}}^{+\infty} F_{h_{m,n}}\left(\frac{B+\sqrt{B^2+4AC2}}{2A}\right)f_\varepsilon(\varepsilon)d\varepsilon$$

b. when C2>0, and Δ2≤0, $P_2$=0.

c. when C2<0, Δ2>0, and ε meets the following formulas (23) and (24), $$\sqrt{\frac{\gamma_{th}\ln(5P_{b,m,n})N_0\{\Delta f_{m,n}(d+\Delta d)-\Delta f_{m,n}(d)\}}{-1.5P_{m,n}(\gamma_{m,n})}} < \quad (23)$$

$$\varepsilon < \sqrt{\frac{-\gamma_{th}\ln(5P_{b,m,n})N_0\Delta f_{m,n}(d+\Delta d)}{1.5P_{m,n}(\gamma_{m,n})}}$$

$$-\sqrt{\frac{-\gamma_{th}\ln(5P_{b,m,n})N_0\Delta f_{m,n}(d+\Delta d)}{1.5P_{m,n}(\gamma_{m,n})}} < \varepsilon < \quad (24)$$

$$-\sqrt{\frac{\gamma_{th}\ln(5P_{b,m,n})N_0\{\Delta f_{m,n}(d+\Delta d)-\Delta f_{m,n}(d)\}}{-1.5P_{m,n}(\gamma_{m,n})}}$$

the following formula (25) may be obtained.

$$0 < \frac{B-\sqrt{B^2+4AC2}}{2A} < h_{m,n} < \frac{B+\sqrt{B^2+4AC2}}{2A} \quad (25)$$

In this case $P_2$ may be calculated as the following formula (26).

$$P_2 = Pr\left(\frac{B-\sqrt{B^2+4AC2}}{2A} < h_{m,n} < \frac{B+\sqrt{B^2+4AC2}}{2A}\right) \quad (26)$$

$$= \int_{-\infty}^{+\infty}\left[F_{h_{m,n}}\left(\frac{B+\sqrt{B^2+4AC2}}{2A}\right) - F_{h_{m,n}}\left(\frac{B-\sqrt{B^2+4AC2}}{2A}\right)\right]$$

-continued $$F_\varepsilon(\varepsilon)d\varepsilon$$

$$= \int_{-\sqrt{\frac{\gamma_{th}\ln(5P_{b,m,n})N_0\{\Delta f_{m,n}(d+\Delta d)-\Delta f_{m,n}(d)\}}{-1.5P_{m,n}(\gamma_{m,n})}}}^{-\sqrt{\frac{-\gamma_{th}\ln(5P_{b,m,n})N_0\Delta f_{m,n}(d+\Delta d)}{1.5P_{m,n}(\gamma_{m,n})}}}$$

$$\left[F_{h_{m,n}}\left(\frac{B+\sqrt{B^2+4AC2}}{2A}\right) - F_{h_{m,n}}\left(\frac{B-\sqrt{B^2+4AC2}}{2A}\right)\right]f_\varepsilon(\varepsilon)d\varepsilon +$$

$$\int_{\sqrt{\frac{-\gamma_{th}\ln(5P_{b,m,n})N_0\Delta f_{m,n}(d+\Delta d)}{1.5P_{m,n}(\gamma_{m,n})}}}^{\sqrt{\frac{\gamma_{th}\ln(5P_{b,m,n})N_0\{\Delta f_{m,n}(d+\Delta d)-\Delta f_{m,n}(d)\}}{-1.5P_{m,n}(\gamma_{m,n})}}}$$

$$\left[F_{h_{m,n}}\left(\frac{B+\sqrt{B^2+4AC2}}{2A}\right) - F_{h_{m,n}}\left(\frac{B-\sqrt{B^2+4AC2}}{2A}\right)\right]f_\varepsilon(\varepsilon)d\varepsilon$$

d. when C2<0 and Δ2≤0, $P_2$=0.

To sum up, the total probability $P_{total}$ of adjusting parameters for the adaptive modulation under the second scenario may be written as the following formula (27).

$$P_{total} = P_1 + P_2 + \frac{1}{2}(1 - P_1 - P_2) \quad (27)$$

The third scenario: Δd=0.

In this scenario, the adjustment probability of the adaptive modulation parameters, due to the channel time-varying, may be calculated as the following formula (28).

$$P = Pr(|\gamma(t) - \gamma(t+\Delta t)| \geq \gamma_{th}) \quad (28)$$

$$= Pr\left(\left|\frac{1.5h_{m,n}^2(t)P_{m,n}(\gamma_{m,n})}{-\ln(5P_{b,m,n})N_0\Delta f_{m,n}} - \frac{1.5h_{m,n}^2(t+\Delta t)P_{m,n}(\gamma_{m,n})}{-\ln(5P_{b,m,n})N_0\Delta f_{m,n}}\right| \geq \gamma_{th}\right)$$

$$= \int_{-\infty}^{0} F_{h_{m,n}}\left(\frac{\varepsilon}{-2} + \gamma_{th}\ln(5P_{b,m,n})N_0\frac{\Delta f_{m,n}}{1.5P_{m,n}(\gamma_{m,n})h_i^2 2\varepsilon}\right)f_\varepsilon(\varepsilon)d\varepsilon +$$

$$\int_{-\infty}^{+\infty}\left(1 - F_{h_{m,n}}\left(-\frac{\varepsilon}{2} - \gamma_{th}\ln(5P_{b,m,n})N_0\frac{\Delta f_{m,n}}{1.5P_{m,n}(\gamma_{m,n})h_i^2 2\varepsilon}\right)\right)f_\varepsilon(\varepsilon)d\varepsilon$$

Where h(t+Δt)=h(t)+ε, h(t) and ε are independent of each other, and ε~N(0, $\sigma_n^2$).

Figure 4:
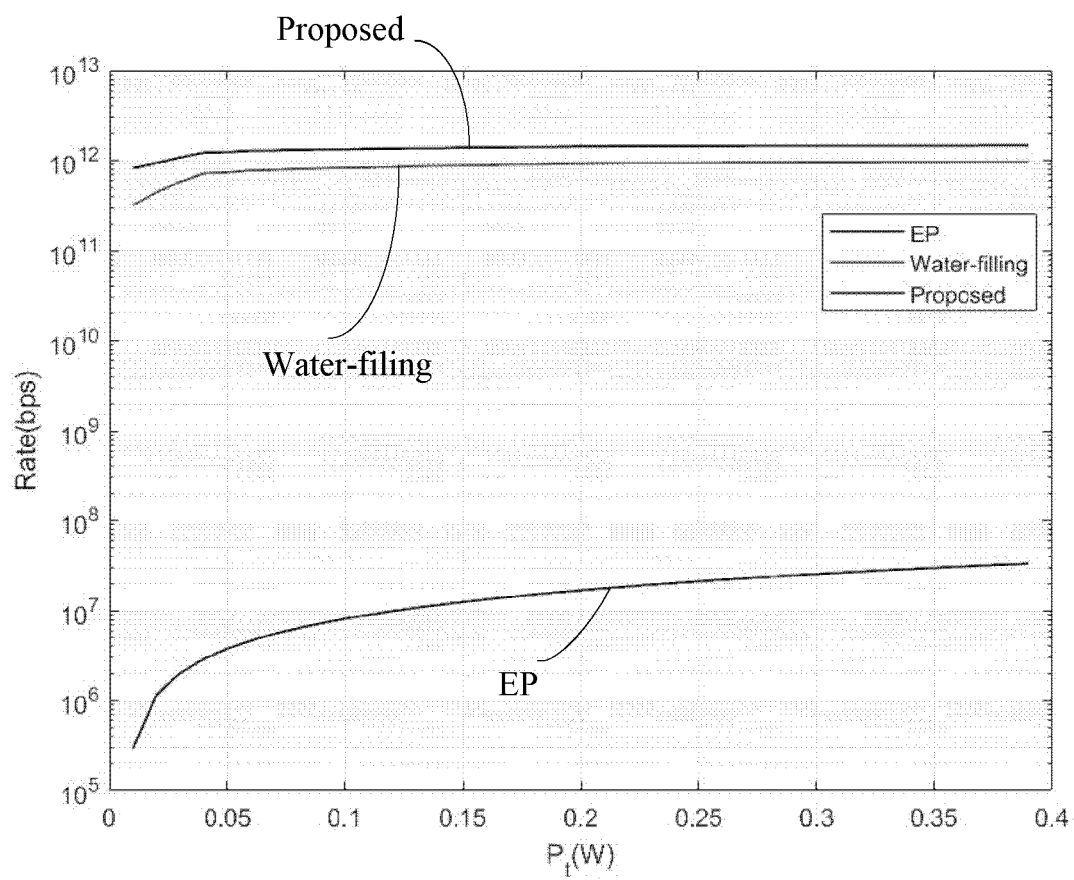
FIG. 4 shows simulation results of data rate of a joint optimization operation according to an embodiment of the present disclosure compared with that of the equal power allocation operation and water-filling power optimization operation.

FIG. 4 shows simulation results of data rate of a joint optimization operation according to an embodiment of the present disclosure compared with that of the equal power (EP) allocation operation and water-filling power optimization operation. In the simulation of the FIG. 4, the number of available sub-windows M may be set as M=5, the number of subcarriers of each sub-window may be set as N1=N2=N3=N4=N5=10, and the available band of the transmission window may be set as B=2.087 THz. The horizontal axis $P_t$(W) refers to the total available power, and the vertical axis Rate (bps) refers to the data rate in unit of bps.

The simulation results in the FIG. 4 shows that the data rate of the joint optimization adaptive modulation proposed by the embodiment of the present disclosure is higher than that of the other two schemes.

Figure 5:
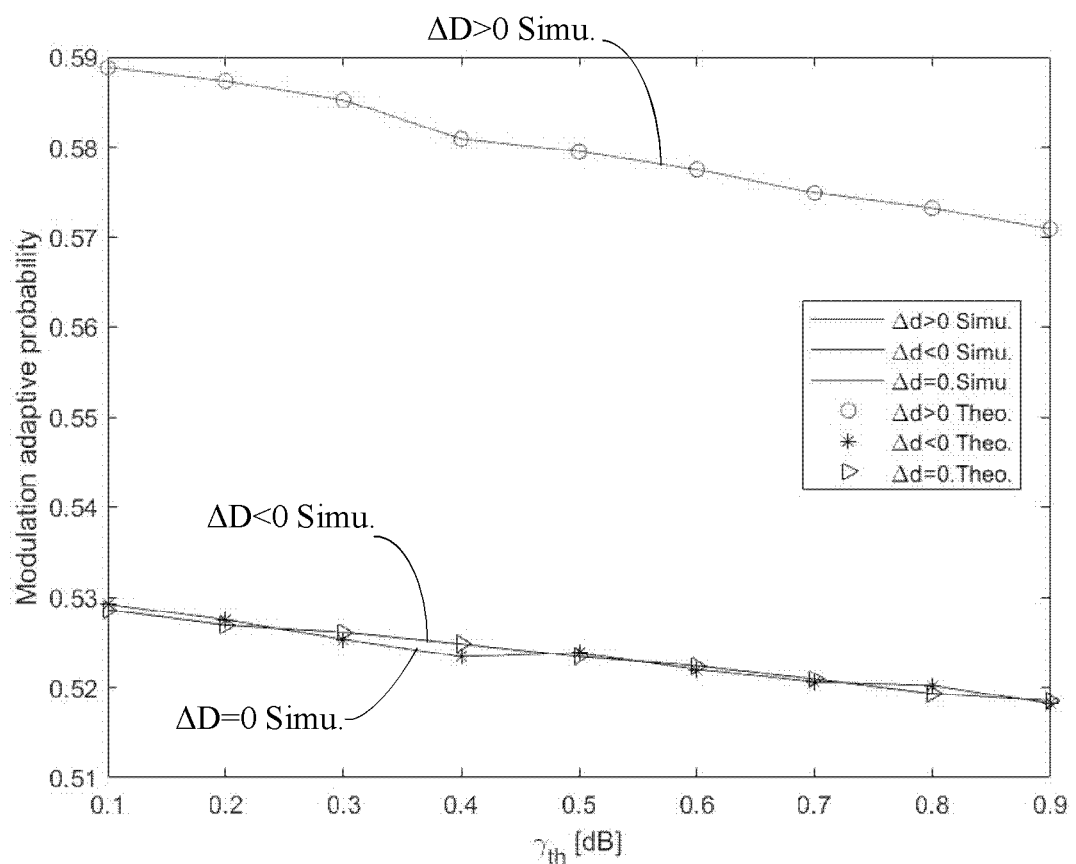
FIG. 5 shows simulation curves of the probabilities that the parameters for adaptive modulation are adjusted when the UE moves according to embodiments of the present disclosure.

FIG. 5 shows simulation curves of the probabilities that the parameters for adaptive modulation are adjusted when the UE moves according to embodiments of the present disclosure. In the FIG. 5, the Simu. refers to the result acquired through simulation, and the Theo. refers to the theoretical result. The horizontal axis $\gamma_{th}$ [dB] refers to the adjustment threshold in terms of SNR in unit of dB, and the vertical axis Modulation adaptive probability refers to the probabilities that the parameters for adaptive modulation are adjusted when the UE moves.

The FIG. 5 shows that the farther the UE moves from the BS, the greater the probability of modulation strategy adjustment. When the UE is stationary or close to the BS, the probability of adjustment is basically the same. At the same time, it can be seen that the higher the adjustment threshold is, the lower the adjustment probability is, because when the adjustment granularity become larger, the channel variation and distance variation that meet the conditions are getting wider, and thus the adjustment probability is becoming lower.

The adaptive modulation solution proposed by the embodiments according to the present disclosure is suitable for THz channel systems, and combined with the BER requirement, the optimal subcarrier band, power allocation and modulation order that maximizes achievable data rate can be determined. Moreover, the adaptive modulation solution can be flexibly adjusted.

Figure 6:
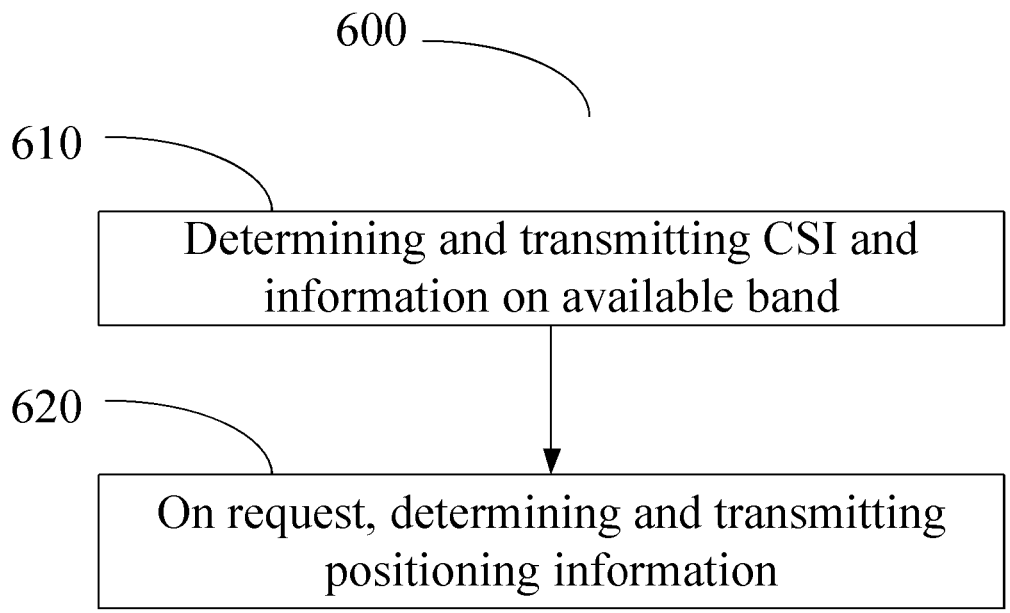
FIG. 6 shows a flow chart illustrating an example method 600 for THz channel communication according to embodiments of the present disclosure.

FIG. 6 shows a flow chart illustrating an example method 600 for THz channel communication according to embodiments of the present disclosure. The example method 600 for transmission property sensitive band group, characterized in employing aware information of a terminal device, which may comprise channel state information, information on available band and positioning information of the terminal device, may be performed for example at any terminal device such as the UE 210.

Referring to the FIG. 6, the example method 600 may include an operation 610 of determining the CSI and the information on the available band and transmitting, to a network device, the CSI and the information on the available band; and an operation 620 of on request, determining the positioning information of the terminal device and transmitting, to the network device, the positioning information.

Details of the operation 610 have been described in the above descriptions with respect to at least the operation 250 and the CSI 255 as well as the operation 245 and the information 258, and repetitive descriptions thereof are omitted here.

Details of the operation 620 have been described in the above descriptions with respect to at least the operation 260 and the positioning information 265, and repetitive descriptions thereof are omitted here.

In an embodiment, the information on the available band is determined by: an operation of receiving, from the network device, mapping information on property of distance and band, the more details of which have been described in the above descriptions with respect to at least the mapping information 230, and repetitive descriptions thereof are omitted here; an operation of determining a band of a transmission window based on the mapping information and a distance to the network device, the more details of which have been described in the above descriptions with respect to at least the operation 235, and repetitive descriptions thereof are omitted here; an operation of identifying whether at the band a subcarrier is an available subcarrier or a virtual subcarrier which fails to support reliable symbol transmission, the more details of which have been described in the above descriptions with respect to at least the operation 240; and an operation of determining the available band by excluding one or more virtual subcarriers from the band, the more details of which have been described in the above descriptions with respect to at least the operation 245.

In an embodiment, the CSI may be calculated based on path loss, beam unaligned fading and multipath fading. The more details have been described in the above descriptions with respect to at least the operation 250 and the CSI 255, and repetitive descriptions thereof are omitted here.

Figure 7:
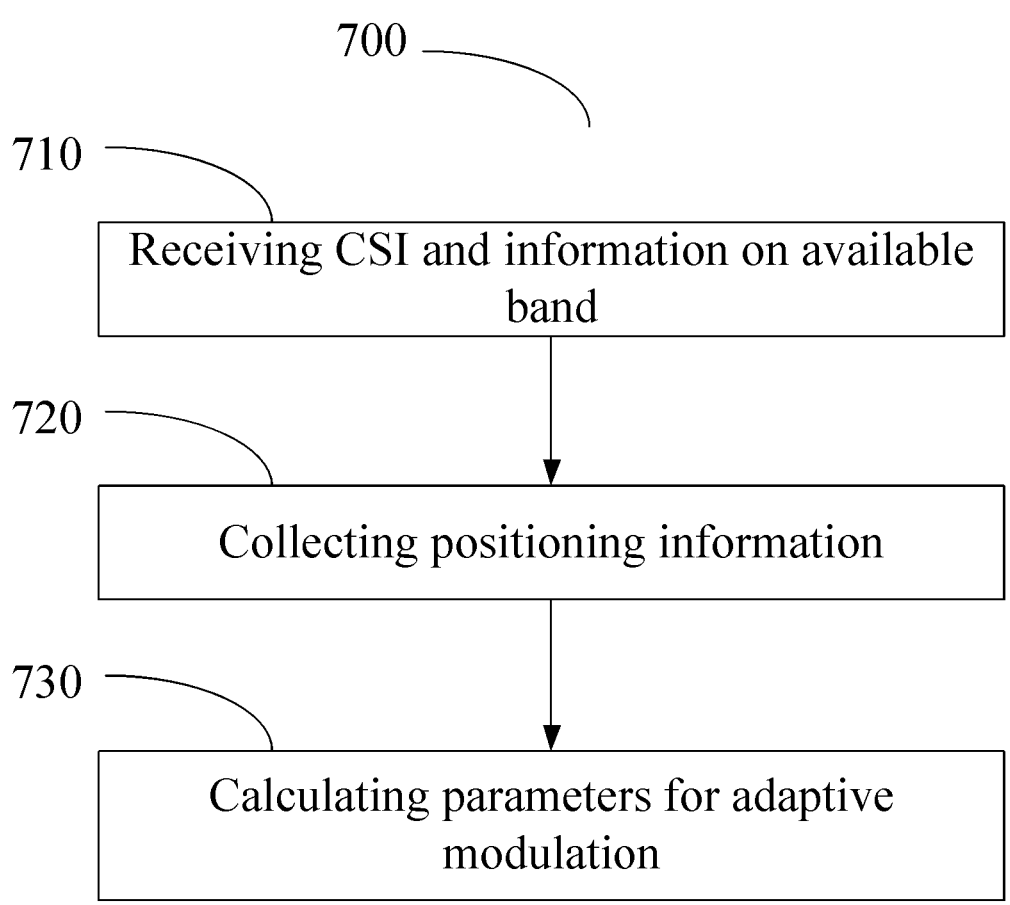
FIG. 7 shows a flow chart illustrating an example method 700 for THz channel communication according to embodiments of the present disclosure.

FIG. 7 shows a flow chart illustrating an example method 700 for THz channel communication according to embodiments of the present disclosure. The example method 700 for transmission property sensitive band group, characterized in employing aware information of a terminal device, which may comprise CSI, information on available band and positioning information of the terminal device, may be performed for example at any network device such as the network device 220.

Referring to the FIG. 7, the example method 700 may include an operation 710 of receiving, from the terminal device, the CSI and the information on the available band; an operation 720 of collecting the positioning information of the terminal device; and an operation 730 of calculating parameters for an adaptive modulation based on the aware information.

Details of the operation 710 have been described in the above descriptions with respect to at least the CSI 255 and the information 258, and repetitive descriptions thereof are omitted here.

Details of the operation 720 have been described in the above descriptions with respect to at least the positioning information, and repetitive descriptions thereof are omitted here.

Details of the operation 730 have been described in the above descriptions with respect to at least the operation 270, and repetitive descriptions thereof are omitted here.

In an embodiment, the aware information may further comprise a SNR, and the example method 700 may further include an operation of determining whether to adjust the parameters based on the aware information and a modulation granularity rule. The more details have been described in the above descriptions with respect to at least the aware information 255 and the operation 280, and repetitive descriptions thereof are omitted here.

In an embodiment, the modulation granularity rule may be associated with a distance to the terminal device, the signal to noise ratio and the available band. The more details have been described in the above descriptions with respect to at least the Table 2, and repetitive descriptions thereof are omitted here.

In an embodiment, the parameters may comprise a subcarrier band, power allocation and a modulation order. The more details have been described in the above descriptions with respect to at least the operation 270, and repetitive descriptions thereof are omitted here.

In an embodiment, the parameters may be calculated according to a BCD approach. The more details have been described in the above descriptions with respect to at least the operation 270 and the BCD approach, and repetitive descriptions thereof are omitted here.

In an embodiment, the adaptive modulation may be a DAMC adaptive modulation. The more details have been described in the above descriptions with respect to at least the operation 270 and the DAMC adaptive modulation, and repetitive descriptions thereof are omitted here.

Figure 8:
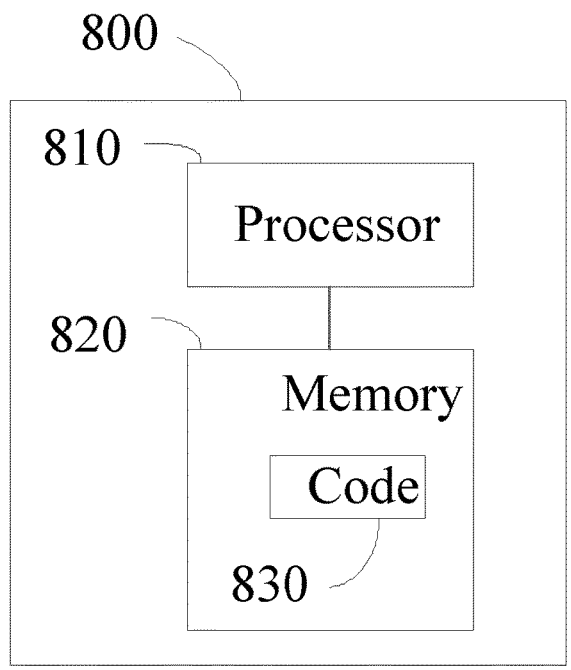
FIG. 8 shows a block diagram illustrating an example device 800 for THz channel communication according to embodiments of the present disclosure.

FIG. 8 shows a block diagram illustrating an example device 800 for THz channel communication according to embodiments of the present disclosure. The apparatus, for example, may be at least part of any terminal device such as the UE 210 in the above examples.

As shown in the FIG. 8, the example device 800 may include at least one processor 810 and at least one memory 820 that may include computer program code 830. The at least one memory 820 and the computer program code 830 may be configured to, with the at least one processor 810, cause the device 800 at least to perform the example method 600 described above.

In various example embodiments, the at least one processor 810 in the example device 800 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 810 may also include at least one other circuitry or element not shown in the FIG. 8.

In various example embodiments, the at least one memory 820 in the example device 800 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 820 may include, but are not limited to, an electric, a magnetic, an optical, an electromagnetic, an infrared, or a semiconductor system, apparatus, or device or any combination of the above.

Further, in various example embodiments, the example device 800 may also include at least one other circuitry, element, and interface, for example at least one I/O interface, at least one antenna element, and the like.

In various example embodiments, the circuitries, parts, elements, and interfaces in the example device 800, including the at least one processor 810 and the at least one memory 820, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the UE 210 is not limited to the above example device 800.

Figure 9:
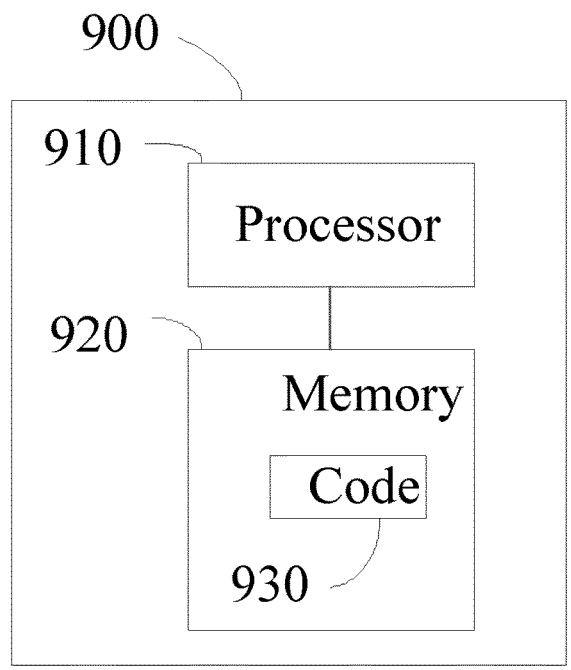
FIG. 9 shows a block diagram illustrating an example device 900 for THz channel communication according to embodiments of the present disclosure.

FIG. 9 shows a block diagram illustrating an example device 900 for THz channel communication according to embodiments of the present disclosure. The apparatus, for example, may be at least part of any network device such as the network device 220 in the above examples.

As shown in the FIG. 9, the example device 900 may include at least one processor 910 and at least one memory 920 that may include computer program code 930. The at least one memory 920 and the computer program code 930 may be configured to, with the at least one processor 910, cause the device 900 at least to perform at least one of the example method 700 described above.

In various example embodiments, the at least one processor 910 in the example device 900 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 910 may also include at least one other circuitry or element not shown in the FIG. 9.

In various example embodiments, the at least one memory 920 in the example device 900 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 920 may include, but are not limited to, an electric, a magnetic, an optical, an electromagnetic, an infrared, or a semiconductor system, apparatus, or device or any combination of the above.

Further, in various example embodiments, the example device 900 may also include at least one other circuitry, element, and interface, for example at least one I/O interface, at least one antenna element, and the like.

In various example embodiments, the circuitries, parts, elements, and interfaces in the example device 900, including the at least one processor 910 and the at least one memory 920, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the network device 220 is not limited to the above example device 900.

Figure 10:
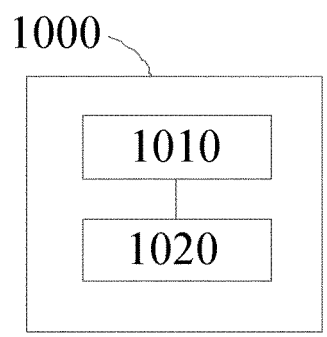
FIG. 10 shows a block diagram illustrating an example apparatus 1000 for THz channel communication according to embodiments of the present disclosure.

FIG. 10 shows a block diagram illustrating an example apparatus 1000 for THz channel communication according to embodiments of the present disclosure. The apparatus, for example, may be at least part of any terminal device such as the UE 210 in the above examples.

As shown in FIG. 10, the example apparatus 1000 may include means 1010 for performing the operation 610 of the example method 600, and means 1020 for performing the operation 620 of the example method 600. In one or more another example embodiments, at least one I/O interface, at least one antenna element, and the like may also be included in the example apparatus 1000.

In some example embodiments, examples of means in the example apparatus 1000 may include circuitries. For example, an example of means 1010 may include a circuitry configured to perform the operation 610 of the example method 600, and an example of means 1020 may include a circuitry configured to perform the operation 620 of the example method 600. In some example embodiments, examples of means may also include software modules and any other suitable function entities.

Figure 11:
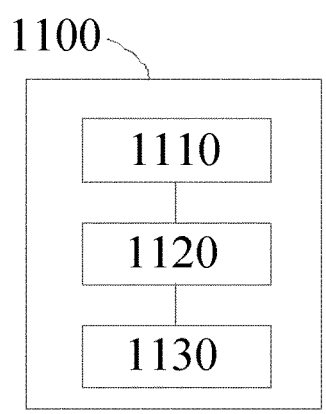
FIG. 11 shows a block diagram illustrating an example apparatus 1100 for THz channel communication according to embodiments of the present disclosure.

FIG. 11 shows a block diagram illustrating an example apparatus 1100 for THz channel communication according to embodiments of the present disclosure. The apparatus, for example, may be at least part of the network device 220 in the above examples.

As shown in the FIG. 11, the example apparatus 1100 may include means 1110 for performing the operation 710 of the example method 700, means 1120 for performing the operation 720 of the example method 700, and means 1130 for performing the operation 730 of the example method 700. In one or more another example embodiments, at least one I/O interface, at least one antenna element, and the like may also be included in the example apparatus 1100.

In some example embodiments, examples of means in the example apparatus 1100 may include circuitries. For example, an example of means 1110 may include a circuitry configured to perform the operation 710 of the example method 700, an example of means 1120 may include a circuitry configured to perform the operation 720 of the example method 700, and an example of means 1130 may include a circuitry configured to perform the operation 730 of the example method 700. In some example embodiments, examples of means may also include software modules and any other suitable function entities.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of the some embodiments described above can be combined to provide further embodiments. The accompanying claims and their equivalents are intended to cover such forms or modifications as would fall within the scope and spirit of the disclosure.

Abbreviations used in the description and/or in the figures are defined as follows:
BCD block coordinate descent
BER bit error rate
BS base station
CDF cumulative density function
CN core network
GNSS global navigation satellite system
CSI channel state information
DAMC distance aware multicarrier
EP equal power
MT mapping table
PBCH physical broadcast channel
PDF probability density function
RB resource block
QAM quadrature amplitude modulation
SNR signal-to-noise ratio SSB synchronization signal block
THz terahertz
UAV unmanned aerial vehicle
UE user equipment

What is claimed is:

1. A communication apparatus operating as a terminal device for transmission of a property sensitive band group, and configured to employ aware information of the terminal device, which comprises channel state information, information on available band and positioning information of the terminal device, the communication apparatus comprising:
   at least one processor; and
   at least one memory including computer program code, the at least one memory and the computer program code being configured to, with the at least one processor, cause the communication apparatus operating as the terminal device to perform:
   determining the channel state information and the information on the available band and transmitting, to a network device, the channel state information and the information on the available band; and
   on request, determining the positioning information of the terminal device and transmitting, to the network device, the positioning information.

2. The communication apparatus of claim 1, wherein the information on the available band is determined by:
   receiving, from the network device, mapping information on property of distance and band;
   determining a band of a transmission window based on the mapping information and a distance to the network device;
   identifying whether at the band a subcarrier is an available subcarrier or a virtual subcarrier which fails to support reliable symbol transmission; and
   determining the available band by excluding one or more virtual subcarriers from the band.

3. The communication apparatus of claim 1, wherein the channel state information is calculated based on path loss, beam unaligned fading and multipath fading.

4. A communication apparatus operating as a network device for transmission of a property sensitive band group, and configured to employ aware information of a terminal device, which comprises channel state information, information on available band and positioning information of the terminal device, the communication apparatus comprising:
   at least one processor; and
   at least one memory including computer program code, the at least one memory and the computer program code being configured to, with the at least one processor, cause the communication apparatus operating as the network device to perform:
   receiving, from the terminal device, the channel state information and the information on the available band;
   collecting the positioning information of the terminal device; and
   calculating parameters for an adaptive modulation based on the aware information.

5. The communication apparatus of claim 4, wherein the aware information further comprises a signal-to-noise ratio, and the at least one memory and the computer program code are further configured to, with the at least one processor, cause the communication apparatus to further perform:
   determining whether to adjust the parameters based on the aware information and a modulation granularity rule.

6. The communication apparatus of claim 5, wherein the modulation granularity rule is associated with a distance to the terminal device, the signal-to-noise ratio and the available band.

7. The communication apparatus of claim 4, wherein the parameters comprise a subcarrier band, power allocation and a modulation order.

8. The communication apparatus of claim 4, wherein the parameters are calculated according to a block coordinate descent approach.

9. The communication apparatus of claim 4, wherein the adaptive modulation comprises a distance aware multicarrier adaptive modulation.

10. A communication method performed by a terminal device for transmission of a property sensitive band group, and configured to employ aware information of the terminal device, which comprises channel state information, information on available band and positioning information of the terminal device, the communication method comprising:
    determining the channel state information and the information on the available band and transmitting, to a network device, the channel state information and the information on the available band; and
    on request, determining the positioning information of the terminal device and transmitting, to the network device, the positioning information.

11. The communication method of claim 10, wherein the information on the available band is determined by:
    receiving, from the network device, mapping information on property of distance and band;
    determining a band of a transmission window based on the mapping information and a distance to the network device;
    identifying whether at the band a subcarrier is an available subcarrier or a virtual subcarrier which fails to support reliable symbol transmission; and
    determining the available band by excluding one or more virtual subcarriers from the band.

12. The communication method of claim 10, wherein the channel state information is calculated based on path loss, beam unaligned fading and multipath fading.

13. A communication method performed by a network device for transmission of a property sensitive band group, and configured to employ aware information of a terminal device, which comprises channel state information, information on available band and positioning information of the terminal device, the communication method comprising:
    receiving, from the terminal device, the channel state information and the information on the available band;
    collecting the positioning information of the terminal device; and
    calculating parameters for an adaptive modulation based on the aware information.

14. The communication method of claim 13, wherein the aware information further comprises a signal-to-noise ratio, and the communication method further comprising:
    determining whether to adjust the parameters based on the aware information and a modulation granularity rule.

15. The communication method of claim 14, wherein the modulation granularity rule is associated with a distance to the terminal device, the signal-to-noise ratio and the available band.

16. The communication method of claim 13, wherein the parameters comprises a subcarrier band, power allocation and a modulation order.

17. The communication method of claim 13, wherein the parameters are calculated according to a block coordinate descent approach.

18. The communication method of claim 13, wherein the adaptive modulation comprises a distance aware multicarrier adaptive modulation.

19. A non-transitory computer readable medium comprising program instructions that, when executed in a terminal device for transmission of a property sensitive band group, and configured to employ aware information of the terminal device, which comprises channel state information, information on available band and positioning information of the terminal device, perform a process, the process comprising:
determining the channel state information and the information on the available band and transmitting, to a network device, the channel state information and the information on the available band; and
on request, determining the positioning information of the terminal device and transmitting, to the network device, the positioning information.

20. A non-transitory computer readable medium comprising program instructions that, when executed in a network device for transmission of a property sensitive band group, and configured to employ aware information of a terminal device, which comprises channel state information, information on available band and positioning information of the terminal device, perform a process, the process comprising:
receiving, from the terminal device, the channel state information and the information on the available band;
collecting the positioning information of the terminal device; and
calculating parameters for an adaptive modulation based on the aware information.

* * * * *